(12) United States Patent
Bucholtz et al.

(10) Patent No.: US 6,279,416 B1
(45) Date of Patent: Aug. 28, 2001

(54) CONTROL APPARATUS FOR HYDRAULIC LOCK

(75) Inventors: Brian Charles Bucholtz, Lakeview; Terrance E. Daul, Hamburg; John M. Janak, West Seneca, all of NY (US)

(73) Assignee: Enidine, Inc., Orchard Park, NY (US)

( * ) Notice: Subject to any disclaimer, the term of this patent is extended or adjusted under 35 U.S.C. 154(b) by 0 days.

(21) Appl. No.: 09/460,564

(22) Filed: Dec. 14, 1999

(51) Int. Cl.$^7$ ........................................... F16C 1/10
(52) U.S. Cl. ........................................ 74/501.5 H; 74/502
(58) Field of Search ............... 74/501.5 H, 502, 74/501.6, 501.5 R, 500.5

(56) References Cited

U.S. PATENT DOCUMENTS

| | | | |
|---|---|---|---|
| 3,730,019 | * 5/1973 | Ballard | ................................ 74/502 |
| 4,354,398 | 10/1982 | Porter . | |
| 4,515,034 | 5/1985 | Porter . | |
| 4,901,594 | * 2/1990 | Selzer | .............................. 74/501.5 H |
| 5,005,677 | 4/1991 | Bucholtz et al. . | |
| 5,029,822 | * 7/1991 | Selzer | .......................... 74/501.5 H X |

* cited by examiner

*Primary Examiner*—Mary Ann Green
(74) *Attorney, Agent, or Firm*—Wall Marjama & Bilinski

(57) ABSTRACT

A control apparatus associated with a hydraulic lock that contains a piston rod and an operating pin slidably contained within piston rod. A conduit contains a proximal end connected to a push button unit and a distal end connected to a lever arm assembly. The lever arm assembly contains a platform secured to the terminal end of the piston rod and a lever arm rotatably mounted over the operating pin. A cable extends through the conduit between a rocker arm in the push button unit and the lever arm so that when the button is depressed, the operating pin is moved from an inoperative position to an operative position. A locking plate is pivotally mounted upon the distal end of the conduit and arranged to move over the top surface of the platform into locking engagement with the piston rod. A cutout is formed in the plate which engages a groove formed in the terminal end of the piston rod to lock the lever arm assembly to the rod with the lever arm in position to engage the operating shaft.

6 Claims, 4 Drawing Sheets

CONTROL APPARATUS FOR HYDRAULIC LOCK

BACKGROUND OF THE INVENTION

The invention relates to an improved hydraulic lock, and in particular to a push button control for a hydraulic lock.

In U.S. Pat. No. 5,005,677 to Bucholtz et al., there is disclosed a hydraulic lock that is ideally suited for use in adjustable back seats of the type typically found on aircraft, trains, buses, and the like. The lock includes a hydraulic cylinder that is mounted between the seat back and the stationary frame of the seat. The cylinder includes a piston rod that is connected to a piston housed within the cylinder. A valving system permits fluid in the cylinder to flow across the piston under controlled conditions thereby permitting the piston rod to be extended or retracted depending on the direction of force exerted on the seat back. A push button control is generally mounted upon the arm rest of the seat which, when depressed, opens the valving system.

As further disclosed in the above noted Bucholtz et al. patent, the push button is connected to a pin slidably contained in the piston rod of the hydraulic lock. To tilt the seat back out of a full upright position, the seat occupant first depresses the button which in turn moves the pin to an operative position unseating a poppet control valve and allowing fluid to flow around the piston. Applying a slight rearward force upon the back of a seat by the occupant causes the seat back to tilt. The exchange of fluid from one side of the piston to the other continues until the back is placed in a desired position whereupon the seat occupant releases the push button closing the poppet valve locking the back in the desired position. To return the back to a full upright position, the seat occupant again depresses the button and a forward force is applied to the back.

Push button control mechanisms employed on airplane seats and the like are in almost constant use and are usually cycled a number of times each day. As a consequence, the control mechanism associated with each seat is subject to frequent maintenance and adjustment checks. It is therefore, highly desirous that the push button control can be quickly and easily removed and reassembled with the hydraulic lock without the need of tools and the like thereby minimizing the amount of down time required for periodic maintenance.

SUMMARY OF THE INVENTION

It is therefore an object of the present invention to improve hydraulic locking devices.

It is a further object of the present invention to improve push button mechanisms for controlling hydraulic locks.

A still further object of the present invention is to improve a cable operated control mechanism for use in a hydraulic lock that is used to adjust the amount of tilt afforded the back rest of a passenger seat of the type generally employed in an aircraft, train or bus.

Another object of the present invention is to provide a push button cable operated control mechanism that can be quickly installed or removed from a passenger seat equipped with a hydraulic lock actuator for adjusting the position of the seat back.

These and other objects of the present invention are attained by a control mechanism for use in a hydraulic lock for controlling the positioning of a seat back, said actuator including a hydraulic cylinder containing an extendable piston rod. The cylinder is mounted for movement between the seat back and the stationary frame of the seat. An operating rod is slidably contained within the piston rod of the cylinder and operatively connected to a valve mechanism which, when opened allows fluid to move from one side of the piston to the other under controlled conditions. The control mechanism includes a push button unit mounted on the arm of the seat and a lever arm assembly that is mounted upon the piston rod of the hydraulic lock. A cable extends from the push button unit to the lever arm assembly through a conduit so that when the push button is depressed, the lever arm causes the operating rod to open a poppet valve within the cylinder whereby fluid is permitted to flow around the piston. The distal end of the conduit is retained in the platform of the lever arm assembly. The distal end of the cable passes through the platform and is secured to a lever arm that is rotatably mounted in the platform. A locking plate is pivotally mounted on the distal end of the conduit so that the plate turns about the axial centerline of the conduit in sliding contact with the top surface of the platform. A circular cutout is formed in the locking plate that opens to one side of the plate. The cutout is adapted to mate with a circumferential groove formed in the terminal end of the piston rod to lock the hydraulic cylinder to the lever assembly. A detent is mounted in the locking plate that is arranged to engage a seat in the platform of the lever assembly to hold the locking plate in a locked position and thus prevent the plate from being prematurely displaced. The bottom of the lever arm is arranged to contact the end of the operating pin to push the pin inwardly when the push button is depressed thereby opening the poppet valve in the cylinder. A torsion spring returns the lever arm to a home position when the push button is released.

BRIEF DESCRIPTION OF THE DRAWINGS

For a better understanding of these and other objects of the invention, reference will be made to the following detailed description of the invention which is to be read in association with the accompanying drawing, wherein.

DESCRIPTION OF THE INVENTION

Figure 1:
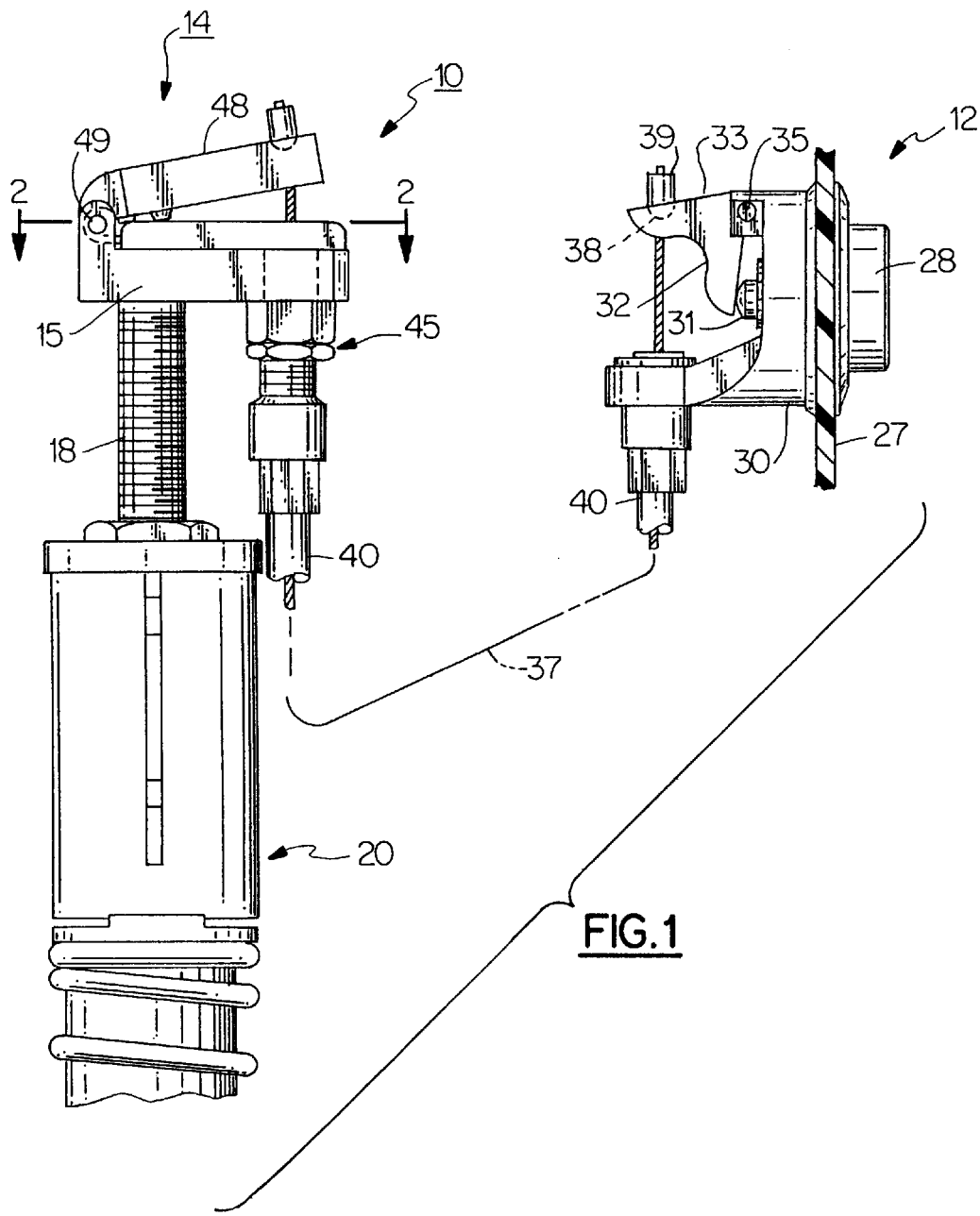
FIG. 1 is a side elevation in partial section illustrating the control mechanism of the present invention.

The control apparatus of the present invention is illustrated generally in FIG. 1 at 10 and includes a push button unit 12 and a lever arm assembly 14. As further illustrated in FIGS. 3–5, the lever arm assembly includes a platform 15 having a hole 16 formed therein that is adapted to slidably receive therein the terminal end 17 of a piston rod 18 associated with a hydraulic lock 20 (FIG. 1) of the type generally employed in association with an aircraft type passenger seat having a tiltable backrest. This type of hydraulic lock is described in detail in the previous noted Bucholtz et al. patent, the description of which is incorporated herein by reference. As described in the Bucholtz et al.

patent, the piston rod 18 of the hydraulic lock is typically attached to a stationary part of the seat frame while the cylinder 20 is attached to the tiltable back of the seat. An operating pin 25 is slidably contained within the piston rod and extends some distance outwardly from the terminal end of the rod. Although not shown, a piston is attached to the rod and is moveably housed within the cylinder. A valving network permits the fluid contained in the cylinder to move past the piston under controlled conditions between front and rear chambers when the pin is depressed This exchange of fluid between chambers permits the seat back position to be selectively adjusted by a person seated in the chair any time the push button is depressed.

The push button unit 12 is generally mounted upon a side panel 27 of the seat arm rest so that the push button 28 can be readily accessed by the chair occupant. The push button is contained within a housing 30 and is operatively connected to a stub shaft 31 having a rounded nose. The stub shaft is arranged to move axially with the push button when the button is depressed and then released.

The nose of the stub shaft rests in contact with one leg 32 of a rocker arm 33 that is pivotally supported in the housing about a hinge pin 35 mounted in the top section of the housing. A cable 37 is held in a slot formed in the other leg 38 of the rocker arm. The cable is prevented from passing through the slot by a fitting 39 swagged or otherwise attached to the proximal end of the cable. The proximal end of a flexible conduit 40 is retained in the base of the housing immediately below leg 38 of the rocker arm and the cable extends downward from the rocker arm into the conduit as shown in FIG. 1.

Figure 3:
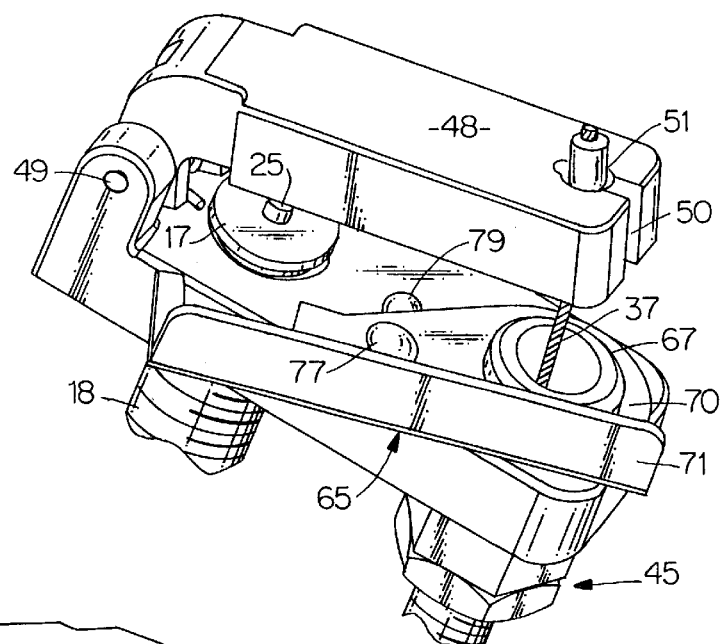
FIG. 3 is a left hand front perspective view showing the lever arm assembly of the invention with the locking plate moved to an open position.
Figure 4:
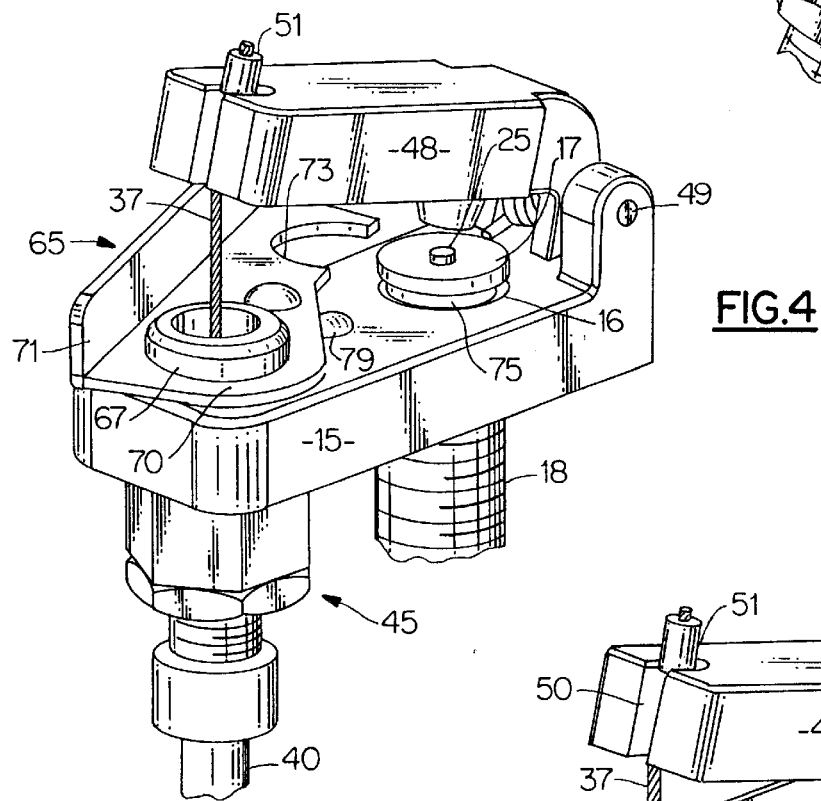
FIG. 4 is a right hand front perspective view of the lever arm assembly with the locking plate in an open position.
Figure 5:
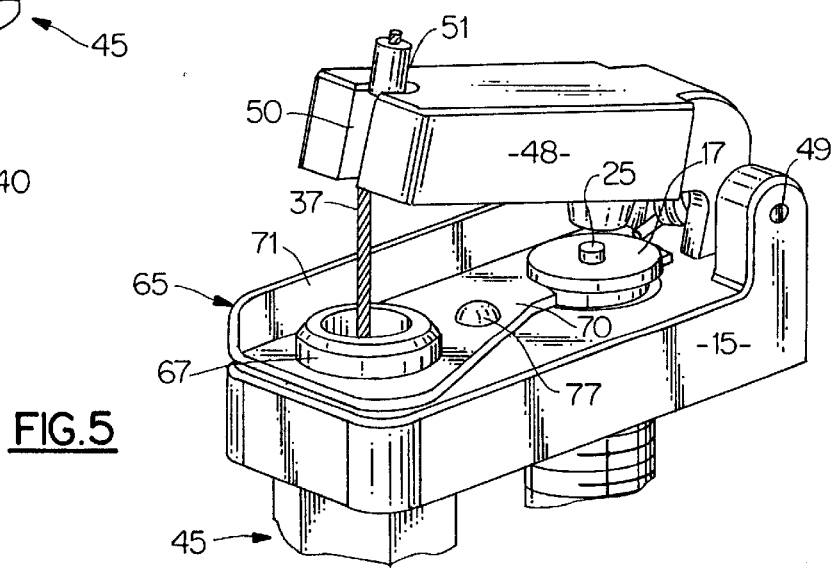
FIG. 5 is a right hand rear perspective view of the lever arm assembly with the locking plate in a closed position.
Figure 7:
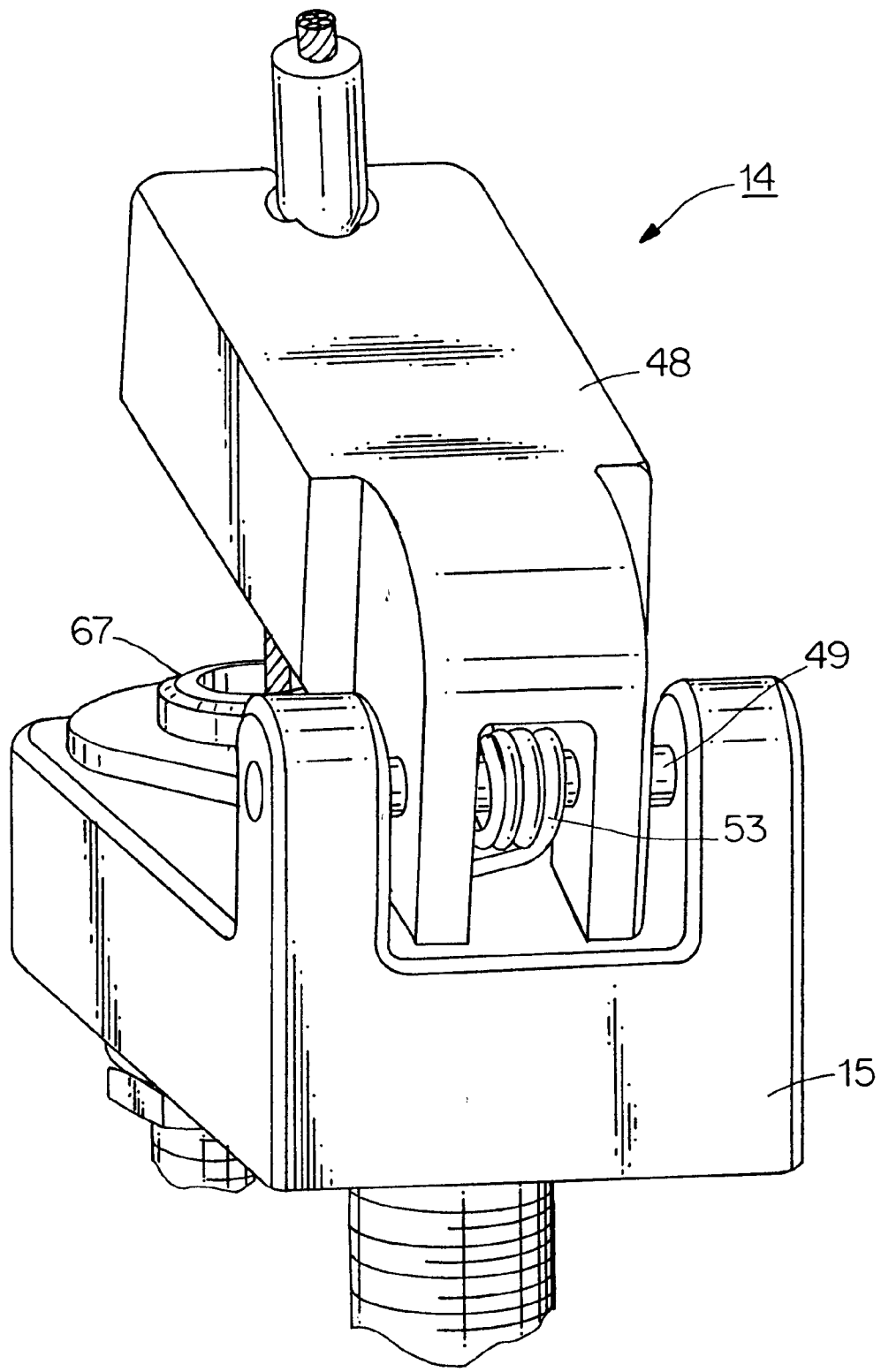
FIG. 7 is an enlarged rear perspective view of the lever arm assembly.

The distal end of the conduit is coupled to an adjustable connector 45 mounted in the platform 15 of the lever arm assembly 14. A lever arm 48 is pivotally mounted at one side of the platform in hinge 49 so that the lever arm extends over the platform above the operating pin 25. A slot 50 is also cut in the terminal end of the lever arm to receive the distal end of the cable 37 that passes upwardly through the adjustable connector 45 as illustrated in FIGS. 3–5. Here again, a fitting 51 is attached to the distal end of the cable to prevent the cable from passing through the slot 50. A torsion spring 53 (FIG. 7) is mounted in the assembly that acts between the platform and the lever arm to urge the lever arm upwardly against the holding force of the cable.

Figure 2:
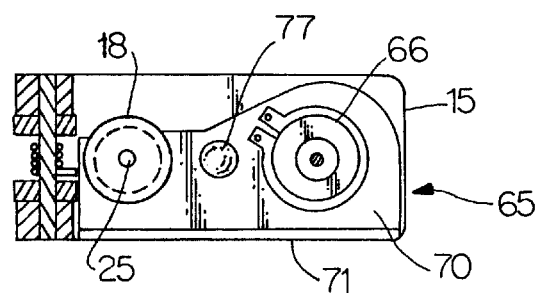
FIG. 2 is a section taken along lines 2—2 in FIG. 1.
Figure 6:
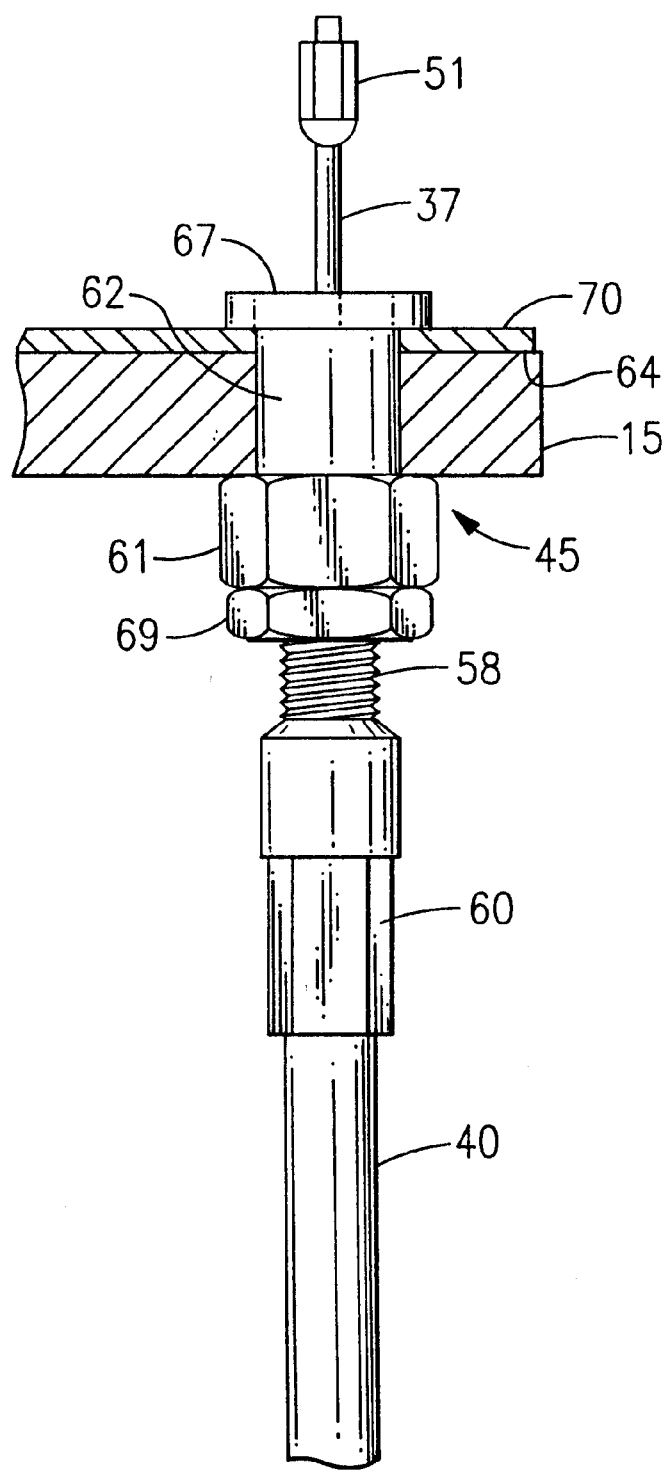
FIG. 6 is an enlarged partial view illustrating the cable adjusting mechanism in further detail.

With further reference to FIG. 6, the adjustable connector 45 includes a threaded shank 58 that is attached to the conduit by a ferrule 60. An adjusting nut 61 containing a female thread is rotatably supported in the platform by a cylindrical rotor 62. The rotor has a raised section that extends upwardly above the top surface 64 of the platform. A locking plate 65 is rotatably contained within the raised section of the rotor so that the plate can slide over the top surface of the platform. The locking plate is secured to the rotor by means of a radially extended C-clamp 66 as shown in FIG. 2 or by a flange 67 as shown in FIG. 6.

In assembly, the threaded shank 58 of the connector is mated with the adjusting nut 61 by simply turning the nut within the platform. This draws the shank into the adjusting nut and thus adjusts the length of the conduit passing between the push button unit and the lever arm assembly. This, in turn, allows for adjustment of the active length of cable extending between the rocker arm and the lever arm.

In practice, the cable length is adjusted so that when the push button is depressed, the lever arm is pulled down a sufficient distance to move the operating pin 25 from an inoperative position to an operative position thereby allowing for an exchange of fluid between the front and rear chambers of the hydraulic lock so that the seat back to be positioned comfortably under controlled conditions. Releasing the push button permits the lever arm to raise and the operating pin to return to the inoperative position. Once the cable is properly adjusted, the adjusting nut is locked in place by a lock nut 69.

The locking plate 65 is an L-shaped member that includes a horizontal wall 70 that rests on the top surface of the platform 15 and a shorter vertical wall 71. A cutout 73 is formed in the outer edge of the horizontal wall that is arranged to move into engagement with a circumferential groove 75 cut into the terminal end of piston rod, thereby locking the piston rod to the platform of the lever arm assembly. A detent includes a circular cusp 77 mounted in the horizontal wall of the locking plate which is arranged to seat upon a raised circular dome 79 formed in the platform when the plate has securely engaged the piston rod of the hydraulic lock 20 thereby preventing the locking plate from prematurely moving out of the locked position as illustrated in FIGS. 2 and 5.

As should be evident from the disclosure above, the control mechanism of the present invention can be quickly and easily removed from the hydraulic lock of an aircraft passenger chair without the aid of tools. To remove the control mechanism, the operator must simply grasp the vertical wall of the locking plate and rotate the plate in a counter-clockwise direction sufficiently to permit the plate to clear the groove formed in the terminal end of the piston rod of the hydraulic lock. Once clear, the lever arm assembly can be lifted free of the piston rod freeing the control mechanism from the hydraulic lock. It should be further noted that unlike many control mechanisms shown in the prior art, the control cable remains attached to lever arm during the time the assembly is freed from the hydraulic lock. Accordingly, the length of the cable does not have to be readjusted when the lever arm assembly is once again reattached to the hydraulic lock.

While this invention has been explained with reference to the structure disclosed herein, it is not confined to the details set forth and this invention is intended to cover any modifications and changes as may come within the scope of the following claims:

What is claimed is:

1. In combination, a hydraulic lock having a piston rod extending outwardly from one end thereof and an operating pin slidably contained within the piston rod that protrudes from the terminal end of said piston rod, and a control apparatus for depressing said pin that includes:

a push button unit connected to a lever arm assembly by a flexible conduit having a cable slidably contained within the conduit;

said lever arm assembly having platform containing an opening for receiving therein the terminal end of said piston rod so that said terminal end of the piston rod and said pin extend above a top surface of said platform and a lever arm pivotally mounted over said pin so that said lever arm can move into depressing contact with said pin;

said cable having a proximal end connected to a push button mounted in said push button unit and a distal end connected to said lever arm so that depressing the push button causes the pin to be depressed from an inoperative position to an operative position whereby the hydraulic lock is unlocked;

said conduit having a distal end that includes a cylindrical rotor that passes upwardly through said platform, said rotor being spaced apart from said piston rod;

a flat plate rotatably mounted upon the rotor above the top surface of said platform so that the plate rotates about said rotor between a locked and an unlocked position;

said plate having one side edge that contains an arcuate shaped cutout therein that is arranged to engage a circumferential groove in the terminal end of said piston rod when the plate is in the locked position whereby the piston rod is secured to the platform; and a detent means acting between the platform and the plate for securing the plate in the locked position.

2. The combination of claim 1 wherein said detent means includes a raised circular dome mounted upon the top surface of the platform and a circular cusp formed in an opposed bottom surface of said plate.

3. The combination of claim 1 wherein said plate further includes a raised wall extending along a second side edge of said plate for facilitating rotation of the plate about said rotor.

4. The combination of claim 1 wherein said lever arm is pivotally mounted upon a hinge and a torsion spring is mounted upon the hinge for biasing the lever arm into a raised position wherein the pin is in an inoperative position.

5. The combination of claim 1 that further includes adjusting means at the distal end of said conduit for adjusting the length of said conduit.

6. The combination of claim 5 that further includes a locking means for securing the adjusting means in a desired position.

\* \* \* \* \*